Sept. 3, 1957
J. J. F. MARCH
2,804,818
ELECTRIC TOASTING, BUTTERING, WARMING
AND GRILLING APPLIANCE
Filed Nov. 16, 1954
2 Sheets-Sheet 1
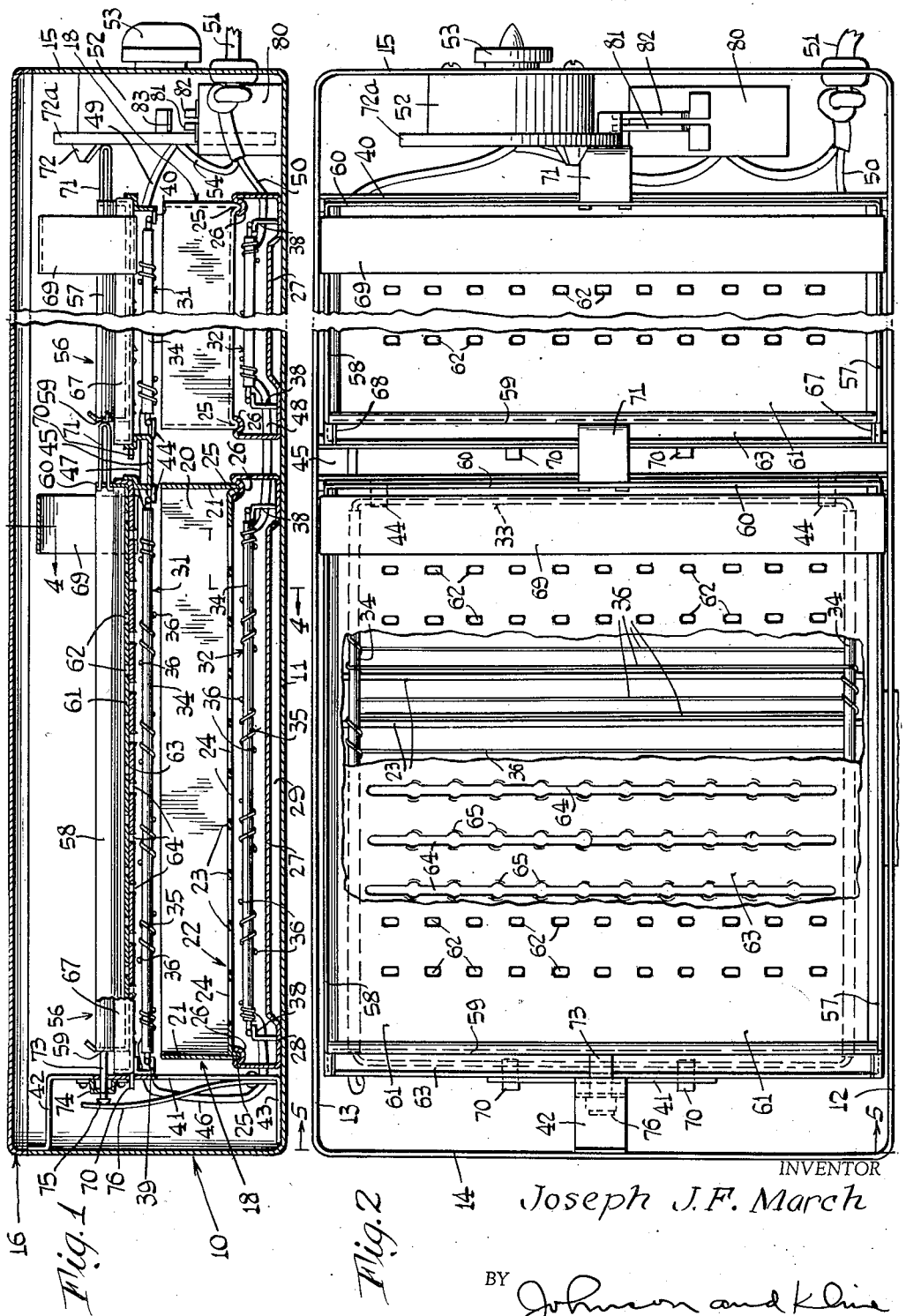
INVENTOR
Joseph J. F. March
BY
Johnson and Kline
ATTORNEYS

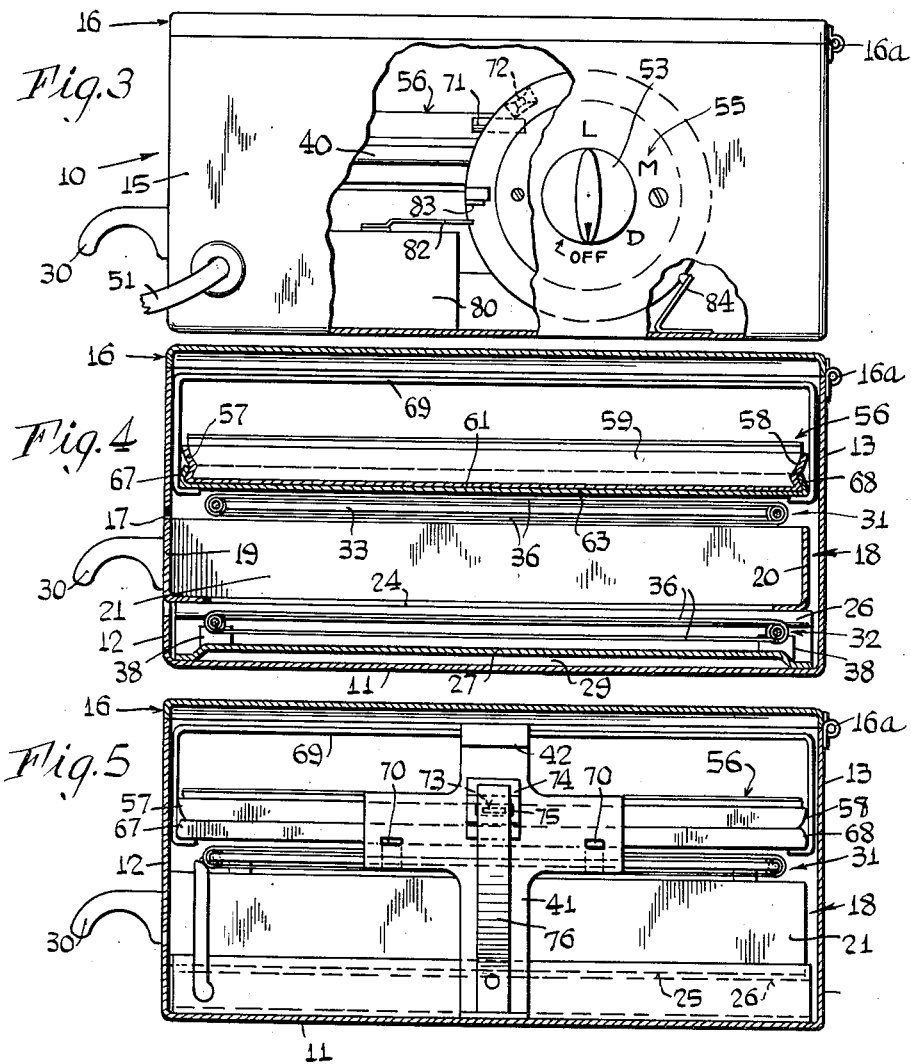
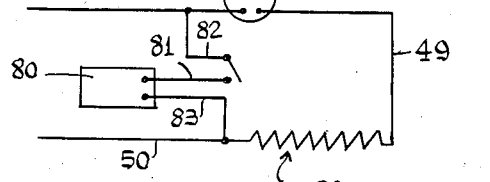

United States Patent Office 2,804,818
Patented Sept. 3, 1957

2,804,818

ELECTRIC TOASTING, BUTTERING, WARMING, AND GRILLING APPLIANCE

Joseph J. F. March, Waterbury, Conn.

Application November 16, 1954, Serial No. 469,219

16 Claims. (Cl. 99—345)

This invention relates to electric appliances, and more particularly to appliances adapted to toast, butter, warm and/or grill food products, especially baked products such as bread and the like.

An object of the invention is to provide a novel and improved electric appliance adapted to automatically toast and butter slices of bread and the like.

Another object of the invention is to provide an improved electric appliance as above set forth, which may also be used for warming and/or grilling.

A further object of the invention is to provide an improved electric appliance in accordance with the above, which is extremely simple in construction and inexpensive to manufacture.

A feature of the invention resides in the provision of an improved appliance of the above type, which may be readily partially dismantled to permit it to be easily washed or cleaned.

Another feature of the invention resides in the provision of an improved appliance as above characterized, which is small and compact, light in weight, and yet simple in operation and reliable over an extended period of use.

Other features and advantages will hereinafter appear.

In the accompanying drawings:

Figure 1 is a vertical, longitudinal sectional view through a combined toasting, buttering, warming and grilling appliance made in accordance with the invention, a portion of the appliance to the right of center being omitted for purposes of illustration.

Fig. 2 is a top or plan view of the appliance shown in Fig. 1 with the top cover removed, portions of a butter tray and flow-control means therefor being broken away to reveal additional details.

Fig. 3 is a right end elevation of the toaster shown in Figs. 1 and 2.

Fig. 4 is a transverse vertical section taken on line 4—4 of Fig. 1.

Fig. 5 is a transverse vertical section taken on line 5—5 of Fig. 2.

Fig. 6 is a schematic circuit diagram of the appliance.

Referring to Figs. 1 and 2 the improved toasting, buttering, warming and grilling appliance of the present invention comprises a low, squat, rectangular, drawn sheet metal casing or housing 10 having a bottom wall 11, front and rear walls 12 and 13 respectively, and left and right end walls 14 and 15 respectively. A flat rectangular cover 16 is provided for the housing 10, the cover 16 being also preferably formed of drawn sheet metal, and being movably carried in any suitable manner on the housing, as by hinges 16a, Figs. 3–5, said cover being arranged to provide an attractive and ornamental closure. The housing 10 and cover 16 may have different sizes and shapes, but preferably it is of a size convenient for use on a kitchen counter or a dining table, being slightly larger than the area which would be covered by two large slices of bread placed horizontally, with juxtaposed edges.

In accordance with the present invention I provide a novel toasting, buttering, warming and grilling structure within the casing 10, arranged to toast and automatically butter slices of bread, sliced rolls or other baked or like food products, or to warm buns or rolls and/or grill sandwiches and the like. In conjunction with this novel structure carried within the housing 10 I provide a pair of elongate, generally rectangular, horizontally-extended openings 17 in the front wall 12 of the housing 10, each of said openings being slightly larger than is necessary to receive a slice of bread, or a roll or sandwich or the like.

Within the housing 10 I provide a pair of sheet metal trays 18 which are generally rectangular in shape and low or squat, said trays being adapted to support the food product, whether it be bread, rolls or other edible articles. The trays 18 have front and rear walls 19 and 20 respectively, side walls 21 and a perforated bottom wall 22 which is in the form of a horizontal grid, comprising a plurality of substantially parallel bars or strips 23 formed by punching out elongate openings 24 in the bottoms of the trays.

It is preferred that the trays 18 have at their sides downwardly formed edges 25 where the bottoms 24 meet the side walls 21, to provide pairs of runners extending fore and aft. The runners 25 are carried in sheet metal slides 26 formed at opposite ends of plates 27 which are secured to the bottom wall 11 of the housing 10 by any suitable means, such as spot-welding. Preferably, as shown in Fig. 1, the plates 27 adjacent the slides 26 are provided with downwardly-offset portions 28 which engage the housing bottom 11, thereby providing spaces 29 between the larger portions of the plates 27 and the housing bottom. The spaces 29 constitute an advantageous heat insulating medium, as will be more fully appreciated as the description proceeds.

The guides 26 are so arranged in the housing 10 that the bread supporting trays 18 will be readily supported thereby after being inserted through the front openings 17, the trays being arranged for easy removability from the housing through the openings whenever desired. Preferably, as shown in Figs. 3–5 the bread supporting trays 18 are provided with handles 30 on their front walls 19, for facilitating their insertion and removal.

By the present invention I provide flat, electric heating elements 31 and 32 disposed in the housing 10 respectively above and below the trays 18 when the latter are supported on the slides 26. The heating elements 31 and 32 are substantially identical to each other, each heating element comprising a rectangular wire frame 33 having heat-resistant insulating sleeves 34 on its front and rear portions, around which suitable current-carrying, heat-producing wires 35 are wound to provide a grid-like pattern, said wires having tightly stretched portions 36 which are parallel to each other. Referring to Fig. 1, the portions 36 of the lower heating elements are staggered with respect to the grid members 23 of the bread supporting tray 18, whereby heat from the wires may be transferred by radiation directly to the underside of a slice of bread or other food product supported in the trays.

The lower heating elements 32 are carried by upright hooked fingers 38 lanced from the plate 27, and the upper heating elements 31 are carried adjacent the ends of the housing 10 by sheet metal brackets 39 and a formed sheet metal strip 40, the latter being secured at its ends to the front and rear walls of the housing 10 in any suitable manner. The brackets 39 are attached to an upright sheet metal member 41 having offset upper and lower end portions 42 and 43 secured to the housing 10. The adjacent or near edges of the upper heating elements 31, at the center portion of the housing 10, are carried by fingers 44 lanced from a channel-like member 45 which is at its ends secured to the front and rear walls of the housing 10. Connections to the heating coils 31 and 32 are established by connector wires 46, 47, 48, 49 and 50, the latter wire leading to the electric cord 51 of the appliance.

The wire 49 connects with a timing switch 52 having a manually-settable knob or control member 53, the switch 52 being mounted in the housing 10 on the end wall 15 thereof whereby the control member 53 may be actuated from the exterior of the housing. A wire 54 leads from the timing switch 52 to the electric cord 51.

The timing switch 52 is of any well-known type, which may be set to maintain a circuit closed for different intervals of time within a predetermined range, and preferably a scale 55 is provided on the exterior of the housing wall 15, having markings indicating "light," "medium" and "dark," corresponding to short, medium and long settings of the timing switch 52. Thus, when the food products are placed in the supporting trays 18 and the latter in turn placed in their operative positions in the housing 10, heat may be applied for different intervals of time to the top and bottom surfaces of the food products, by the upper and lower heating elements 31 and 32, as determined by the setting which is given to the timing switch 52. The spaces 29 between the bottom 11 of the housing and the plates 27 help to provide heat insulation to keep the housing cool.

In accordance with the present invention I provide a novel butter-melting and applicator means in conjunction with the heating elements 31, 32 and the bread supporting trays 18, whereby at the completion of a toasting cycle butter will be automatically applied to the upper toasted surfaces of the bread. This butter-melting and applicator means comprises a pair of flat trays 56 for holding butter, said trays being formed of sheet metal and having a generally rectangular shape, with front and rear walls 57 and 58 respectively, and side walls 59 and 60. The butter trays 56 are in heat-receiving relation with the heating elements 31 and 32 so that chunks of butter deposited in the trays will be melted, and have bottoms 61 provided with rows of perforations 62 out of which the molten butter may flow.

For the purpose of controlling the flow of butter through the perforations 62 in the butter trays 56 shutter plates 63 are provided, underlying the bottoms 61 of the butter trays 56, said shutter plates 63 each having a plurality of parallel slots 64 extending fore and aft and spaced the same as the spacing between the rows of perforations 62. The side edges of the slots 64 have recessed, depressed portions 65, preferably located in staggered relation with the perforations 62 in the butter trays 56. The butter trays 56 are slidable on the shutter plates 63 so as to bring the perforations 62 either into or out of registration with the slots 64. When the perforations and slots are out of registration, butter which is carried in the trays 56 will be prevented from flowing out of the perforations 62; when the perforations 62 and slots 64 are in registration, butter in the trays 56 will flow downward through the perforations 62 and slots 64 and will drip from the depressed portions 65 of the slots onto the bread supported in the trays 18. By the provision of the depressed portions 65 butter will be prevented from running longitudinally along the edges of the slots 64, and this is a novel feature of the invention.

Referring to Fig. 1 it will be noted that the slots 64 and the wires 36 of the upper heating elements 31 are staggered with respect to each other; thus butter which drips from the slots will not encounter the heating wires but instead will pass between the latter and be deposited onto the upper surface of the bread which has been toasted.

Referring to Fig. 4 the front and rear walls 57 and 58 of the butter trays 56 are indented along longitudinal lines, and the shutter plates 63 are provided with inward, angularly extending front and rear flanges 67 and 68 which respectively interlock with the indented walls 57 and 58 to provide an inseparable, slidable connection between the trays 58 and shutter plates 63.

Reffering to Figs. 1 and 4, the shutter plates 63 are provided with U-shaped upstanding handles 69 at their right ends, to enable the tray and plate assemblies to be easily and quickly inserted in or removed from the housing 10. The shutter plates 63 have pairs of supporting fingers 70 at their left ends, as viewed in Fig. 1, said fingers of the leftmost plate being received in slots in the upright member 41 of the housing. The supporting fingers 70 of the rightmost tray are received in slots in the transverse channel-like support 45 which is also fastened to the housing 10. The rightmost ends of the shutter plates 63 fit into and are carried respectively by the support members 45 and 40 of the housing, and by this arrangement I provide for easy and quick removal of the shutter plates together with the butter trays 56 assembled thereto, thereby to enable these parts to be easily and throughly cleaned, as by wiping with a cloth, washing or the like.

By the present invention I provide for automatic actuation of the butter trays 56 just prior to completion of the toasting cycle, thereby to deposit the melted butter from the trays automatically onto the upper toasted surfaces of the bread slices or other products carried in the supporting trays 18. The butter trays 56 have actuating members or tabs 71 formed of doubled-over sheet metal strips, at their rightmost ends as viewed in Fig. 1. The tab 71 of the left butter tray 56 engages the left end wall of the right butter tray 56, thus constituting a driving coupling between the trays. The actuator tab 71 of the right tray 56 is adapted to be engaged by a cam 72 on a rotary disk 72a of the timing switch 52, such engagement occurring near the termination of operation of the timing switch, after the toasting operation has been virtually completed. The butter trays 56 are spring biased to the right, as viewed in Fig. 1, by a flat pin 73 carried in a bearing bracket 74 on the upright member 41, said pin having a headed end 75 engaged by a leaf spring 76 which is at its lower end secured to the lower portion of the upright member 41.

Thus the butter trays 56 are normally maintained in a position shifted to the right, as shown in Fig. 1, wherein the rows of perforations 62 are out of registration with the slots 64 of the shutter plate 63. When the butter trays 56 are shifted to the left by the cam 72, the perforations 62 and slots 64 are brought into registration, permitting the melted butter in the trays to pass downward onto the bread slices in the supporting trays 18.

Referring to Figs 1–3 and 6 I provide, in conjunction with the timing switch 52, an alarm or indicator apparatus arranged to be made operative after the toasting and buttering operation has been completed. As shown, an electric buzzer 80 is provided, having switch contacts 81 and 82 arranged to be bridged by a movable switch contact 83 carried and actuated by the timing switch disk 72a.

The circuit for the buzzer 80 is shown in Fig. 6, wherein the contacts 81 and 82 are connected respectively to the buzzer 80 and to the wire 54 from the supply cord 51. The buzzer 80 is connected by a wire 83 to the supply wire 50. As shown in Fig. 3, the timing switch 52 has a normal or "off" position wherein the cam 72 is positioned in readiness for engagement with the actuator tab 71. The timing switch 52 is maintained in this position by a spring detent 84. With the parts at rest, the detent 84 is sufficiently strong to maintain the timing switch 52 in the normal "off" position shown; however, when the timing switch 52 is in operation the intertia of the moving parts is sufficient to carry the disk 72a, on which the cam 72 and contact 83 are mounted, past the normal "off" position. This will result in the cam 72 shifting the butter trays 56, and also will cause energization of the buzzer 80. The user, in such circumstance, merely gives the control knob 53 a slight clockwise turn to make the detent 84 again operative, whereupon the buzzer 80 is silenced and the butter trays 56 shifted to their shut-off positions.

From the foregoing it will be understood that, in order to automatically toast and butter slices of bread, these are merely placed in the supporting trays 18 and the latter positioned in the housing 10. Butter is placed in the butter trays 56, either in chunks or in melted condition, and the controlling member 56 of the timing switch 52 turned to the desired position. The heating elements will then be energized, toasting the bread and melting the butter. As the timing switch 52 returns toward "off" position it will pass by the "off" index mark, overcoming the detent 84 and shifting the butter trays 56 to permit the melted butter to flow onto the toast. The buzzer 80 will be sounded, whereupon the control knob 53 is turned slightly clockwise, see Fig. 3, to silence the buzzer and shift the butter trays 56 back to shut-off positions. The toast may then be removed, being completely buttered.

It should be understood that my improved appliance as above set forth may be used without the buttering feature, as a warming device for rolls, toast, etc., and also as a grilling device, to grill cheese and ham sandwiches and the like. Or, if desired, the grilled sandwiches may be automatically buttered at the termination of the grilling.

Variations and modifications may be made within the scope of the claims and portions of the improvements may be used without others.

I claim:

1. An electrical appliance for toasting and buttering slices of bread, comprising a horizontal grid for supporting a slice of bread; flat electric heating elements disposed above and below the grid and arranged broadside thereto, for toasting both sides of said slice of bread, the upper heating element comprising a plurality of spaced resistance members; a butter reservoir comprising a flat tray having a relatively large, flat expansive surface constituting its bottom for holding butter, said surface being disposed above and broadside to the upper heating element, said tray and the said surface thereof having a size commensurate with that of the upper heating element and being adapted to be heated thereby to melt butter placed thereon; and actuatable flow-control means including a multiplicity of drip openings in said butter tray and a multiplicity of movable closures therefor, for enabling molten butter from the tray to flow downward in distributed quantities onto the slice of bread on the grid, said drip openings being located above the spaces between said resistance members.

2. The invention as defined in claim 1 in which there are settable means including a switch mechanism for controlling the duration of energization of the heating elements, and in which there are means controlled by said settable means, for operating the said flow-control means to cause said flow of butter after a predetermined interval of energization of the heating elements.

3. The invention as defined in claim 2 in which there is an indicator and means for automatically operating said indicator upon completion of energization of the heating elements.

4. The invention as defined in claim 3 in which the settable means includes a manually-operable member having an "on" position and two juxtaposed "off" positions, and in which the indicator is operable for one of said "off" positions and is rendered inoperative when the member is in the other of said "off" positions.

5. The invention as defined in claim 2 in which the settable means is adjustable to vary at will the duration of energization of the heating elements.

6. The invention as defined in claim 1 in which the flow-control means comprises a plate engaging the bottom of the tray and having openings which may be brought into or out of registration with the said drip openings upon relative movement between the plate and tray bottom.

7. The invention as defined in claim 1 in which the drip openings in the flat-tray are disposed in rows and columns, and in which the flow-control means comprises a plate engaging the bottom of the tray and having parallel slots each individually extending between its side edges, which slots may be brought into or out of registration with the said drip openings upon relative movement between the plate and tray.

8. The invention as defined in claim 1 in which there is a supporting frame, carrying the butter tray, in which the flow-control means includes a perforated plate carried by the frame, engaged with the bottom of the butter tray the latter being shiftable with respect to the plate and in which the tray and plate are removable as a unit from the frame, for storage and cleaning purposes.

9. The invention as defined in claim 1 in which there is a supporting frame having a slide means carrying the bread-supporting grid, said grid being removable substantially horizontally from said slide means to provide for insertion or removal of the bread.

10. The invention as defined in claim 1 in which the flow-control means includes a plate engaging the bottom of the butter-tray, said plate having openings registerable with the drip-openings of the tray and having downwardly-offset drip edges bordering said registerable openings.

11. The invention as defined in claim 1 in which the heating element below the slice-supporting grid and the said grid have elongate members which are located in staggered relation, thereby to minimize impediment of heat from the element to the bread.

12. The invention as defined in claim 1 in which all of the drip-openings are disposed in rows, and in which the members of the upper heating element are elongate and disposed in staggered relation to all of the rows of drip-openings, thereby to not interfere with the downward flow of butter from said openings to the bread.

13. The invention as defined in claim 1 in which the flow-control means includes a plate disposed below and in engagement with the bottom of the butter tray, said plate having interlocking engagement with and being slidable on and inseparable from the tray.

14. The invention as defined in claim 1 in which there are settable means including a switch and switch operator for automatically controlling the duration of energization of the heating elements, in which there is a cam carried by the switch operator, and in which the flow-control includes a plate in said tray, actuated by said cam.

15. An electrical appliance for toasting and buttering slices of bread, comprising a pair of horizontal grids disposed substantially in a single horizontal plane with their edges juxtaposed, said grids being each adapted to support a slice of bread; pairs of flat electric heating elements disposed respectively above and below the grids and arranged broadside thereto, for toasting both sides of said slices of bread, the upper heating elements comprising each a plurality of spaced resistance members; a pair of butter reservoirs comprising flat trays, located above and closely spaced from the upper heating elements respectively, said trays being in intimate heat-receiving relation with said elements and each having a relatively large, expansive surface constituting its bottom for holding butter, disposed respectively above and broadside to the upper heating elements, said trays and the said surfaces thereof each having a size commensurate with that of the upper heating element associated therewith and adapted to be heated thereby to melt butter placed thereon; a pair of actuatable flow-control means associated respectively with the butter trays and each including a multiplicity of drip openings in said butter trays and a multiplicity of movable closures therefor, for enabling molten butter from the trays to flow downward in distributed quantities onto the slices of bread on the grids, said drip openings being located above the spaces between said resistance members; and connector means between the pair of flow-control means, providing for simultaneous actuation thereof.

16. An electrical toasting and buttering table appliance comprising a horizontal grid for supporting slices of bread; flat electric heating elements disposed above and below the grid and arranged broadside thereto, for applying heat to both sides of said bread, the upper heating element comprising a plurality of spaced resistance members; a housing extending around said grid, and heating elements, having an opening in its front through which the grid may be inserted and removed; slide means in said housing, for removably supporting the grid therein, said grid having a front wall extending flush with the front of the housing and closing the opening thereof when the grid is supported in the housing on said slide, said housing having an openable top; a butter reservoir comprising a flat, heat-intercepting tray disposed in the top of the housing over the upper heating element and receiving heat therefrom for melting butter placed in the tray, said tray having drip openings located above the spaces between said resistance members; a shutter plate disposed adjacent said tray, said plate having closure portions and being actuatable to cover and uncover said drip openings, both said plate and tray being removable from the housing for cleaning or storage and to expose the upper heating element.

References Cited in the file of this patent
UNITED STATES PATENTS

| | | |
|---|---|---|
| 1,416,992 | Stehman | May 23, 1922 |
| 1,460,486 | Harvey | July 3, 1923 |
| 1,633,391 | Beskin | June 21, 1927 |
| 1,786,345 | Itzi | Dec. 23, 1930 |
| 1,862,733 | Wright | June 14, 1932 |
| 1,870,170 | Browning | Aug. 2, 1932 |
| 1,946,886 | Schramm | Feb. 13, 1934 |
| 2,030,047 | Bonzagni et al. | Feb. 11, 1936 |
| 2,083,147 | Clarkson | June 8, 1937 |
| 2,088,499 | Warner | July 27, 1937 |
| 2,481,711 | Bemis | Sept. 13, 1949 |
| 2,509,693 | Morrison | May 30, 1950 |